(12) United States Patent
Tang et al.

(10) Patent No.: US 10,741,003 B2
(45) Date of Patent: Aug. 11, 2020

(54) DEVICE AND METHODS FOR FACILITATING A SALE OF AN ITEM

(71) Applicant: MASTERCARD ASIA/PACIFIC PTE. LTD., Singapore (SG)

(72) Inventors: Hao Tang, Singapore (SG); Ting Shiuan Loh, Singapore (SG); Jiaming Li, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 20 days.

(21) Appl. No.: 16/044,551

(22) Filed: Jul. 25, 2018

(65) Prior Publication Data

US 2019/0051093 A1    Feb. 14, 2019

(30) Foreign Application Priority Data

Aug. 11, 2017  (SG) .............................. 10201706588R (51) Int. Cl.
| | |
|---|---|
| *G06F 7/08* | (2006.01) |
| *G07F 17/00* | (2006.01) |
| *G06Q 30/06* | (2012.01) |
| *G07F 11/62* | (2006.01) |
| *G07F 11/00* | (2006.01) |
| *G06Q 20/02* | (2012.01) |
| *G07F 17/12* | (2006.01) |

(52) U.S. Cl.
CPC ....... *G07F 17/0042* (2013.01); *G06Q 20/027* (2013.01); *G06Q 30/0645* (2013.01); *G07F 11/002* (2013.01); *G07F 11/62* (2013.01); *G07F 17/12* (2013.01)

(58) Field of Classification Search
CPC .... G07F 17/0042; G07F 11/002; G07F 11/62; G06Q 30/0645
USPC ......................................... 235/381, 383, 431
See application file for complete search history.

(56) References Cited

U.S. PATENT DOCUMENTS 6,435,407 B1 * 8/2002 Fiordelisi ................ A47F 9/045
235/383

* cited by examiner

*Primary Examiner* — Karl D Frech
(74) *Attorney, Agent, or Firm* — Hovey Williams LLP (57) ABSTRACT

A device and methods for facilitating a sale of an item from a seller to a customer are disclosed. The device comprises a lockable compartment configured to contain the item, wherein the compartment unlocks upon receiving a sale initiation instruction. The device further comprises a sensor configured to detect a presence of the item in the compartment. The device also comprises a gateway module configured to transmit a sale completion instruction for completing the sale of the item if upon an occurrence of a predetermined event, the sensor detects that the item is absent from the compartment.

19 Claims, 8 Drawing Sheets

DEVICE AND METHODS FOR FACILITATING A SALE OF AN ITEM

CROSS REFERENCE TO RELATED APPLICATIONS

This application claims priority to Singapore Application Ser. No. 10201706588R, filed Aug. 11, 2017, which is incorporated herein by reference in its entirety

FIELD OF INVENTION

The present invention relates broadly, but not exclusively, to a device and methods for facilitating a sale of an item.

BACKGROUND

Commerce involves the activity of selling goods by a seller to a customer. The seller may be a business owner or a consumer and the goods may be a new or a used item. There exist numerous ways to sell goods in the market.

Conventionally, the activities occur in a physical store, where the customers make payments for the goods when checking out at the store. Since the store owner or employees have to be physically present to manage the store, the overhead expenses, such as the labour and rental costs, of the business are relatively high.

With the advent of technology, electronic commerce (e-commerce) is becoming increasingly popular among the consumers and is becoming a main source of income to many businesses. Some e-commerce companies are Carousell®, eBay® and Amazon.com®. However, e-commerce does not allow the goods to be viewed in person by the customers and the delivery of the goods takes time.

In addition, the seller may also arrange to meet the customer to complete the transaction after being contacted by a customer online. However, this mode of transaction requires both parties to commute and thus causing loss in time and in travelling cost. The customer may also refuse to buy the good upon meeting up, thus causing much distress to the seller.

A need therefore exists to provide a solution for facilitating a sale of an item that addresses at least one of the problems above or to provide a useful alternative.

SUMMARY

According to a first aspect of the present invention, there is provided a device for facilitating a sale of an item from a seller to a customer, the device comprising:

a lockable compartment configured to contain the item, wherein the compartment unlocks upon receiving a sale initiation instruction;

a sensor configured to detect a presence of the item in the compartment; and a gateway module configured to transmit a sale completion instruction for completing the sale of the item if upon an occurrence of a predetermined event, the sensor detects that the item is absent from the compartment.

The device may further comprise a user interface module, the user interface module may be configured to:

receive customer payment instrument information; and transmit the sale initiation instruction to the compartment for unlocking the compartment.

The user interface module may further be configured to:
receive the sale completion instruction from the gateway module; and transmit a transaction authorisation request including the customer payment instrument information to a payment network.

The user interface module may further be configured to:
receive seller payment instrument information; and transmit the seller payment instrument information to the payment network upon receiving the sale completion instruction, for processing payment of funds from the sale of the item to the seller based on the seller payment instrument information.

The user interface module may further be configured to:
receive seller payment instrument information; and transmit the seller payment instrument information to a payment network if the sale of the item is terminated, for charging the seller a rental fee based on the seller payment instrument information.

The device may further comprise a display screen and wherein the user interface module may further be configured to:

receive item data from the seller; and transmit the item data to the display screen for displaying the item data.

The item data may comprise one or more selected from a group consisting of selling price of the item, description of the item, available discount, seller details, item review, and payment term.

The compartment may comprise a door, and wherein the predetermined event may comprise the door being closed after the compartment receives the sale initiation instruction, such that the compartment is in a locked configuration.

The predetermined event may comprise a predefined period passing after the compartment receives the sale initiation instruction.

At least a part of the door may comprise a transparent material, allowing the item to be seen through the door.

According to a second aspect of the present invention, there is provided a method for facilitating a sale of an item from a seller to a customer, the method comprising the steps of:

receiving, by a compartment, a sale initiation instruction from a user interface module;

unlocking the compartment, wherein the compartment contains the item;

determining an occurrence of a predetermined event;

detecting, by a sensor, whether the item is absent from the compartment; and if the item is absent from the compartment, transmitting, by a gateway module, a sale completion instruction for completing the sale of the item.

The method may further comprise the steps of:
receiving, by the user interface module, customer payment instrument information; and transmitting, by the user interface module, the sale initiation instruction to the compartment for unlocking the compartment.

The method may further comprise the steps of:
receiving, by the user interface module, the sale completion instruction from the gateway module; and transmitting, by the user interface module, a transaction authorisation request including the customer payment instrument information to a payment network.

The method may further comprise the steps of:
receiving, by the user interface module, seller payment instrument information; and transmitting, by the user interface module, the seller payment instrument information to the payment network upon receiving the sale completion instruction, for processing payment of funds from the sale of the item to the seller based on the seller payment instrument information.

The method may further comprise the steps of:

receiving, by the user interface module, seller payment instrument information; and transmitting, by the user interface module, the seller payment instrument information to a payment network if the sale of the item is terminated, for charging the seller a rental fee based on the seller payment instrument information.

The method may further comprise the steps of:

receiving, by the user interface module, item data from the seller; and transmitting, by the user interface module, the item data to a display screen for displaying the item data.

The compartment may comprise a door, and wherein the predetermined event may comprise the door being closed after the compartment receives the sale initiation instruction, such that the compartment is in a locked configuration.

The predetermined event may comprise a predefined period passing after the compartment receives the sale initiation instruction.

At least a part of the door may include a transparent material, allowing the item to be seen through the door.

According to a third aspect of the present invention, there is provided a method for facilitating a sale of an item from a seller to a customer, the method comprising the steps of:

receiving customer payment instrument information;

transmitting a sale initiation instruction to a compartment for unlocking the compartment;

receiving a sale completion instruction from a gateway module; and transmitting a transaction authorisation request including the customer payment instrument information to a payment network.

BRIEF DESCRIPTION OF THE DRAWINGS

Embodiments of the invention are provided by way of example only, and will be better understood and readily apparent to one of ordinary skill in the art from the following written description and the drawings, in which.

DETAILED DESCRIPTION

Embodiments of the present invention will be described, by way of example only, with reference to the drawings.

Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "obtaining", "estimating", "assigning", "creating", "predicting", "capturing", "scanning", "calculating", "determining", "replacing", "generating", "initializing", "outputting", "detecting", "transmitting", "receiving", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers.

As used herein, the terms "module" and "database" refer to a single computing device or a plurality of interconnected computing devices which operate together to perform a particular function. That is, the "module" and "database" may be contained within a single hardware unit or be distributed among several or many different hardware units. An exemplary computing device which may be operated as a "module" and "database" is described below with reference to FIG. 7.

As used herein, the term "payment instrument information" refers to electronic payment data associated with any payment card or payment account that is used for settlement of an electronic financial transaction.

The embodiments are related to a device and methods for facilitating a sale of an item from a seller to a customer. The device comprises one or more lockable compartments. Each compartment can be unlocked to allow access to a space within the compartment. The device is typically owned by a device owner and the compartment can be rented out to sellers. In use, a seller chooses a compartment of suitable size. The seller then inputs relevant item data and provides his/her payment instrument information to the device. Next, the seller places the item into the compartment and locks the compartment. A customer can unlock the compartment to inspect the item after providing his/her payment instrument information to the device. If the customer wishes to purchase the item, he/she can leave with the item and the payment instrument information provided by the customer will be used to charge the customer. Otherwise, the customer may return the item to the compartment and no charge will be incurred to the customer.

Figure 1A:
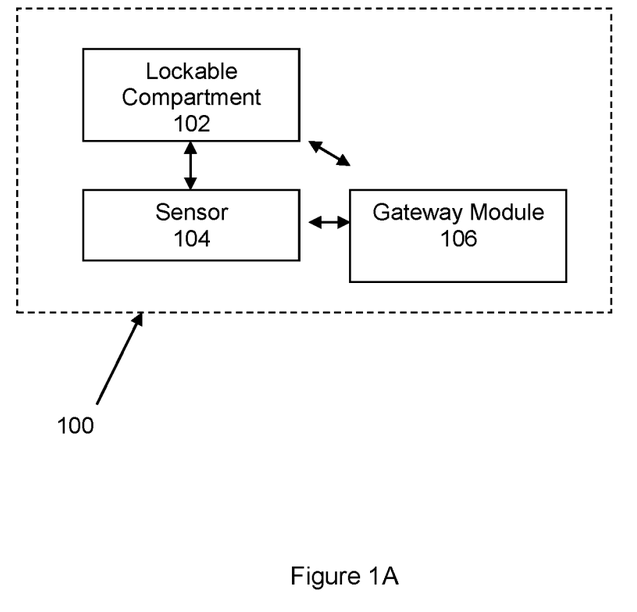
FIG. 1A shows a schematic diagram illustrating a device for facilitating a sale of an item from a seller to a customer in accordance with an example embodiment.

FIG. 1A shows a schematic diagram illustrating a device 100 for facilitating a sale of an item from a seller to a customer in accordance with an example embodiment. The device 100 comprises a lockable compartment 102, a sensor 104, and a gateway module 106 in communication with each other. The compartment 102 is configured to contain the item and unlocks upon receiving a sale initiation instruction to allow the customer to retrieve the item from the compartment 102. The sensor 104 is configured to detect a presence of the item in the compartment 102. The gateway module 106 is configured to transmit a sale completion instruction for completing the sale of the item if upon an occurrence of a predetermined event, the sensor 104 detects that the item is absent from the compartment 102. Although a single compartment 102, sensor 104, and gateway module 106, are shown for the sake of clarity, the device 100 may include more than one of any of these units.

In an embodiment, the compartment 102 has four flat panels attached to each other along a length-wise direction of each panel to form an enclosed cross-section with two opposing end openings that are rectangular in shape. The enclosed cross-section is placed in a horizontal orientation and the four panels form the left, right, top, and bottom side panels of the compartment 102 respectively. A rear panel can be attached to cover the rear end opening. Alternatively, the rear end opening can be covered by mounting the rear side of the compartment 102 to a wall.

A door is mounted to the panels to cover the front end opening. The door can be closed to lock the compartment 102 and can be opened to allow access to a space within the compartment 102 through the front end opening. At least a part of the door is made of a transparent material, allowing the space within the compartment 102 and the item to be seen through the door. Other parts of the door and the panels may be made of any suitable rigid materials, such as stainless steel, aluminium, wood, and plastic. If the device 100 has more than one compartment 102, each of the compartments may be represented by an identifier, e.g. a number, an alphabet, or a combination thereof.

It will be appreciated by a person skilled in the art that the shape and size of the compartment 102 may vary in different embodiments. For example, the compartment can be in the shape of a cube, cylinder, or sphere. Further, it will be appreciated that the door can be mounted to the panels using any suitable fixture, e.g. a door hinge or a sliding track, such that the compartment 102 can be opened by raising, pulling, or sliding the door.

The sensor 104 is configured to detect a presence of the item in the compartment 102. In an embodiment, the sensor 104 is a pressure sensor that is placed in the compartment 102 to detect whether there is any external weight being applied onto the bottom side panel of the compartment 102. The pressure sensor is configured to generate electrical signals with magnitudes that vary according to the weight applied onto the bottom side panel. The electrical signals generated are transmitted to the gateway module 106. It will be appreciated by a person skilled in the art that other sensors, e.g. an infra-red (IR) sensor, can be used to detect the presence of the item in the compartment 102.

The gateway module 106 is in communication with the compartment 102 and the sensor 104. For example, the gateway module 106 receives information from the compartment 102 to determine whether the compartment 102 is locked or unlocked and from the sensor 104 to determine whether the item is absent from the compartment 102. In an embodiment, the gateway module 106 transmits the sale completion instruction if the item is absent from the compartment 102 when the compartment 102 is closed after receiving the sale initiation instruction. In another embodiment, the gateway module 102 transmits the sale completion instruction if the compartment 102 is unlocked for a predefined period after receiving the sale initiation instruction (e.g. 2 minutes) and the item is absent from the compartment 102 at the end of the predefined period. In other words, the predefined period is a maximum time a customer can inspect the item before a sale is finalised. The sale completion instruction is transmitted to a user interface module (described with respect to FIG. 1B) for completing the sale of the item.

It will be appreciated that the gateway module 106 may also be used to exchange data between the compartment 102 and the user interface module. For example, upon receiving customer payment instrument information, the user interface module transmits the sale initiation instruction to the compartment 102 via the gateway module 106.

Figure 1B:
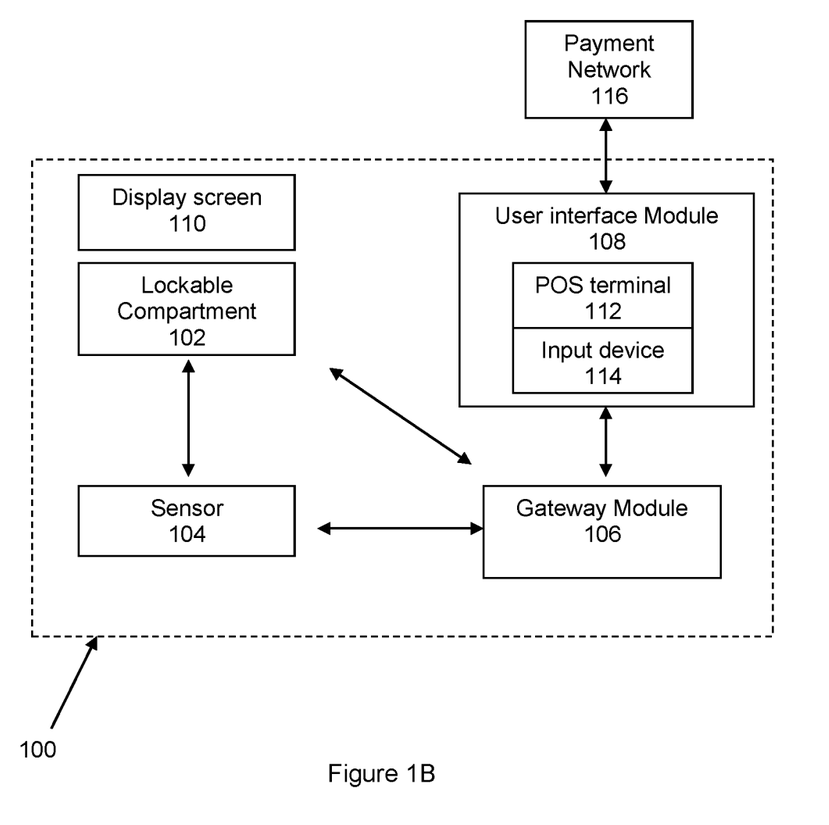
FIG. 1B shows a schematic diagram illustrating a device for facilitating a sale of an item from a seller to a customer in accordance with another example embodiment.

FIG. 1B shows a schematic diagram illustrating a device 100 for facilitating a sale of an item from a seller to a customer in accordance with another example embodiment. The compartment 102, sensor 104, and gateway module 106 have been described with respect to FIG. 1A. The device 100 further comprises a user interface module 108 and a display screen 110.

The user interface module 108 allows input of information by the seller or the customer. Examples of the information are payment instrument information of the seller or the customer and item data. As shown in FIG. 1B, the user interface module 108 includes a point of sale (POS) terminal 112. The POS terminal 112 is configured to obtain seller and customer payment instrument information. For example, the seller is prompted to insert his/her payment card to the POS terminal 112 in order to sell an item. The customer is prompted to insert his/her payment card to the POS terminal 112 in order to unlock the compartment 102.

The user interface module 108 is configured to transmit the seller and customer payment instrument information to a payment network 116 upon receiving the sale completion instruction from the gateway module 106. The customer payment instrument information is used for charging the customer and the seller payment instrument information is used for processing a payment of funds from the sale of the item to the seller. In an embodiment, the funds are the price of the item, deducting the rental fee the compartment 102 and/or commission charges.

The user interface module 108 further includes an input device 114, e.g. a touch screen monitor or a keyboard. The input device 114 allows a seller to input item data. Examples of the item data includes, but not limited to, selling price of the item, description of the item, available discount, seller details, item review, and payment term. If the device 100 has more than one compartment 102, the sellers and customers can also select the compartment 102 using the input device 114. Further, the input device 114 also allows the seller or customer to input payment instrument information, e.g. a PayPal® account details, instead of using the POS terminal 112.

It will be appreciated by a person skilled in that art that the user interface module 108 may be an online platform that is accessible by an electronic device. For example, the online system includes a website that allows the seller or customer to provide the payment instrument information or the item data. In another example, the user interface module 108 includes a mobile device application installed in a seller or customer's mobile device. The online platform may also be used to notify the user of the status of the sale. For example, the seller may receive a message in the website when the item is purchased by a customer.

The display screen 110 is configured to display relevant information of the compartment 102, such as the item data received by the input device 114 and the compartment number. The display screen 110 may also be used to display other information, e.g. a timer that starts counting down from the predefined period when the compartment is unlocked. The display screen 110 is usually attached to the door of the compartment 102 for easy reference by the sellers and customers.

Figure 2:
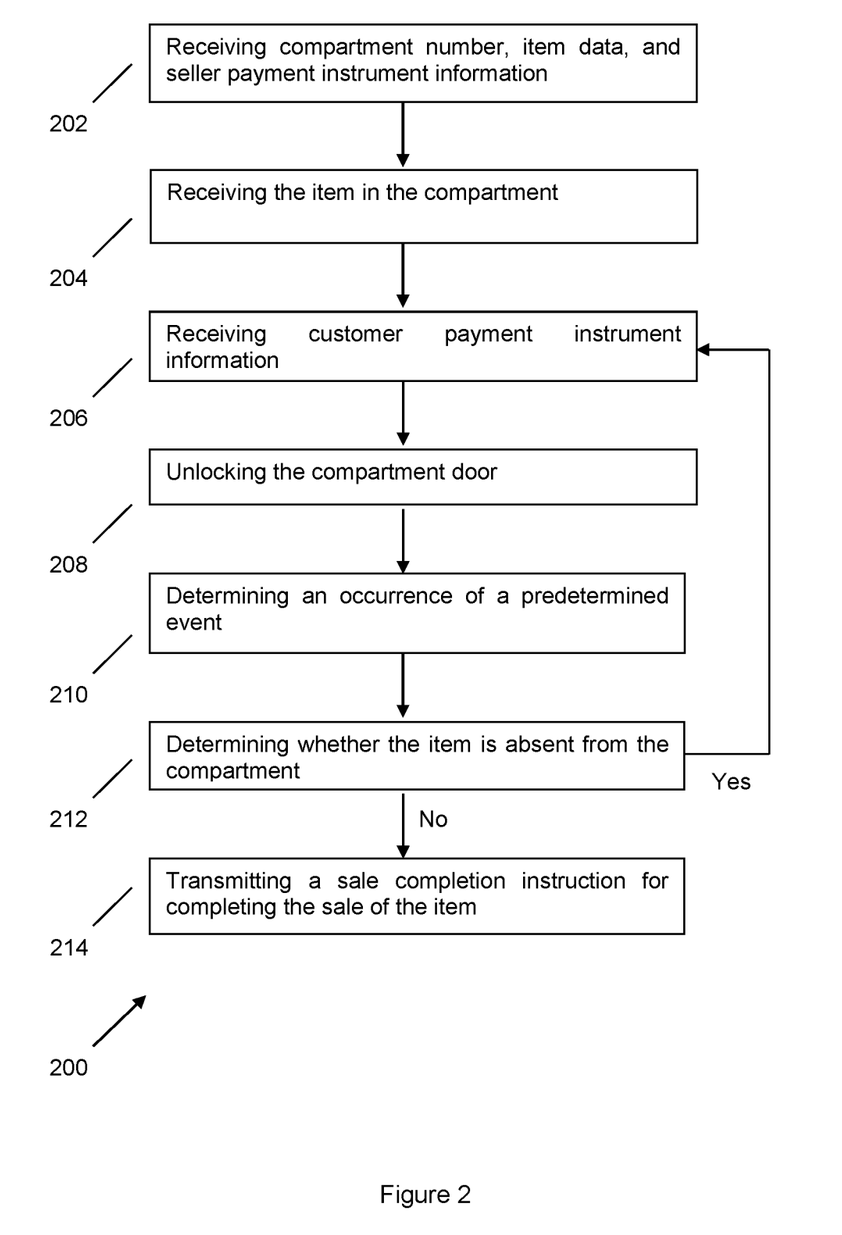
FIG. 2 shows a flowchart illustrating a method for facilitating a sale of an item from a seller to a customer using the device of FIG. 1A or 1B.

FIG. 2 shows a flowchart 200 illustrating a method for facilitating a sale of an item from a seller to a customer using the device 100 of FIG. 1A or 1B. At step 202, the POS terminal 112 receives seller payment instrument information. For example, the seller inserts his/her payment card to the POS terminal. The input device 114 receives the compartment number and the item data from the seller. The item data is transmitted to the display screen 110 attached to the selected compartment 102. At step 204, the compartment 102 receives the item and the door of the compartment 102 is closed by the seller.

At step 206, the POS terminal 112 receives customer payment instrument information. The input device 114 receives the number of the selected compartment 102 from the customer. In an embodiment, the customer payment instrument information is transmitted to the payment network 116 for pre-authorisation of a payment transaction. The payment network 116 may check whether there are sufficient funds associated with a customer payment account to make the relevant payments. At step 208, the user interface module 108 transmits the sale initiation instruction to the compartment to unlock the compartment 102, such that the item within the compartment 102 can be retrieved by the customer.

At step 210, the gateway module 106 determines an occurrence of a predetermined event, e.g. the door of the compartment 102 is closed or the compartment 102 is in the unlocked configuration for a predefined period. At step 212, the sensor 104 detects whether the item is absent from the compartment 102. If the item is absent, the gateway module 106 transmits a sale completion instruction to the user interface module 108 at step 214. The user interface module 108 then transmits a transaction authorisation request, including the seller and customer payment instrument information, to the payment network 116 for completing the sale transaction. The customer is charged the price of the item and the seller is paid the funds from the sale. If the sensor 104 determines that the item is still present at step 212, the gateway module 106 does not transmit the sale completion instruction since no sale is made. The buying process will be repeated for the next customer.

Figure 3:
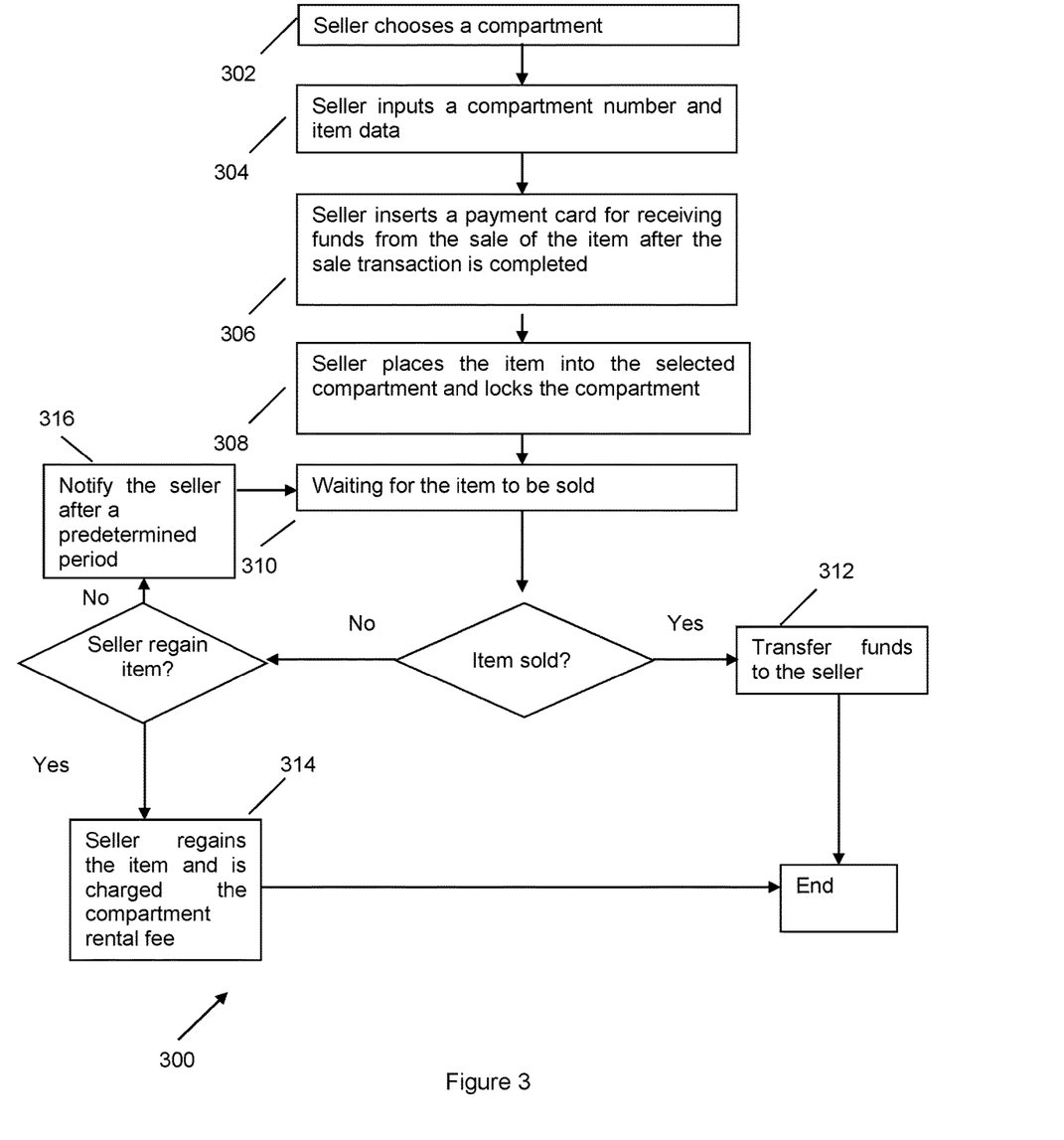
FIG. 3 shows a flowchart illustrating steps to sell an item using the device of FIG. 1A or 1B.

FIG. 3 shows a flowchart 300 illustrating steps to sell an item using the device 100 of FIG. 1A or 1B. At step 302, a seller chooses a compartment 102 of suitable size that can fit the item. At step 304, the seller inputs the number of the selected compartment 102. The seller also inputs the item data using the input device 114. For example, the seller may fill in the item description and price in designated boxes on a touch screen monitor. At step 306, the seller inserts his/her payment card to the POS terminal 112 for receiving funds from the sale of the item after the sale transaction is completed. At step 308, the seller places the item into the selected compartment 102 and locks the compartment 102. The item is displayed in the compartment 102 and waiting to be sold (as shown in step 310). If the item is sold, the seller payment card details will be transmitted to the payment network 116 and the funds from the sale will be transferred to the seller (as shown in step 312). Fees or charges will be deducted from the sales price before the rest of the funds is transferred to the seller's account. If the item is not sold, the seller may choose to regain the item and terminate the sale of the item. In that case, the seller may input the instruction using the input device 114 and the seller payment instrument information will be transmitted to the payment network 116 for charging the seller the rental fee for using the compartment 102 (as shown in step 314). If the item remains unsold and is not regained by the seller, the seller may be notified after a predetermined period to remind the seller of the pending sale of the item (as shown in step 316).

Figure 4:
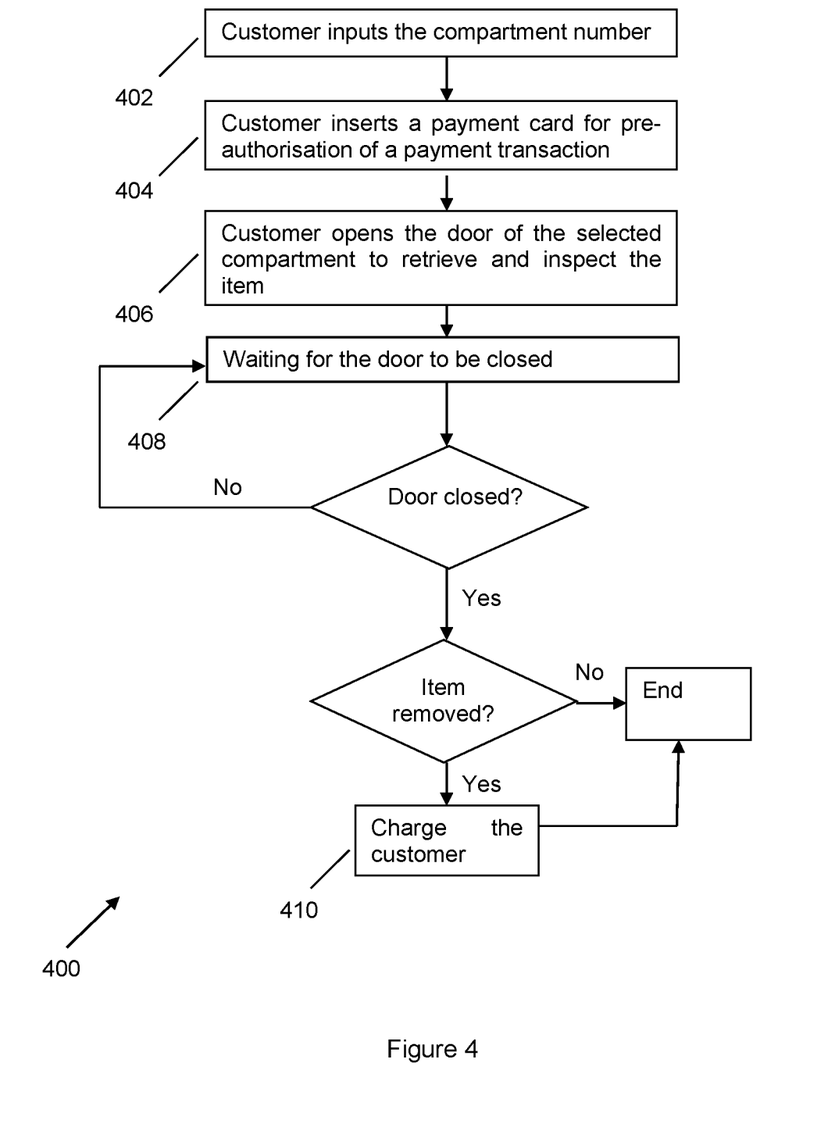
FIG. 4 shows a flowchart illustrating steps to buy an item using the device of FIG. 1A or 1B.

FIG. 4 shows a flowchart 400 illustrating steps to buy an item using the device 100 of FIG. 1A or 1B. At step 402, the customer uses the input device 114 to input the number of the compartment 102 containing the item that the customer wishes to buy. At step 404, the customer inserts his/her payment card to the POS terminal 112 for pre-authorisation of a payment transaction. At step 406, the customer opens the door of the selected compartment 102 to retrieve and inspect the item. The device 100 waits for the customer to close the door (as shown in step 408). If the item is removed from the compartment 102 when the door is closed, a transaction authorisation request including the customer payment card details will be transmitted to the payment network 116 (as shown in step 410).

Figure 5:
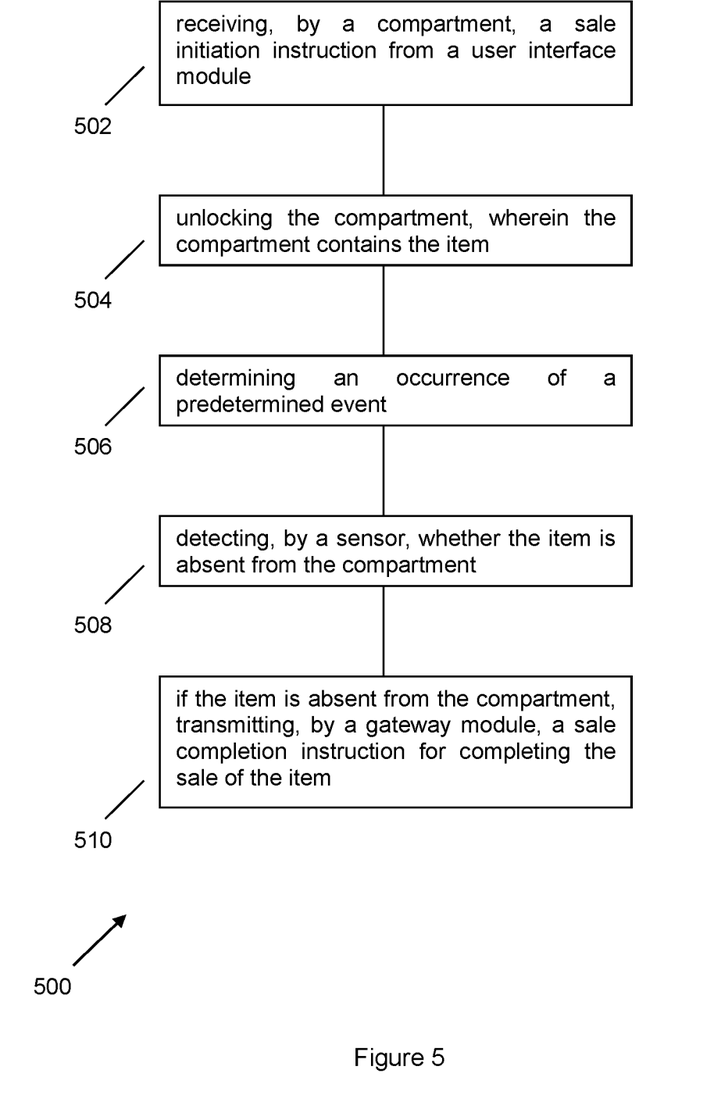
FIG. 5 shows a flowchart illustrating a method for facilitating a sale of an item from a seller to a customer according to an example embodiment.

FIG. 5 shows a flowchart 500 illustrating a method for facilitating a sale of an item from a seller to a customer according to an example embodiment. At step 502, a compartment receives a sale initiation instruction from a user interface module. At step 504, the compartment containing the item is unlocked. At step 506, an occurrence of a predetermined event is determined. At step 508, a sensor detects whether the item is absent from the compartment. At step 510, if the sensor detects that the item is absent from the compartment, a gateway module transmits a sale completion instruction for completing the sale of the item.

Figure 6:
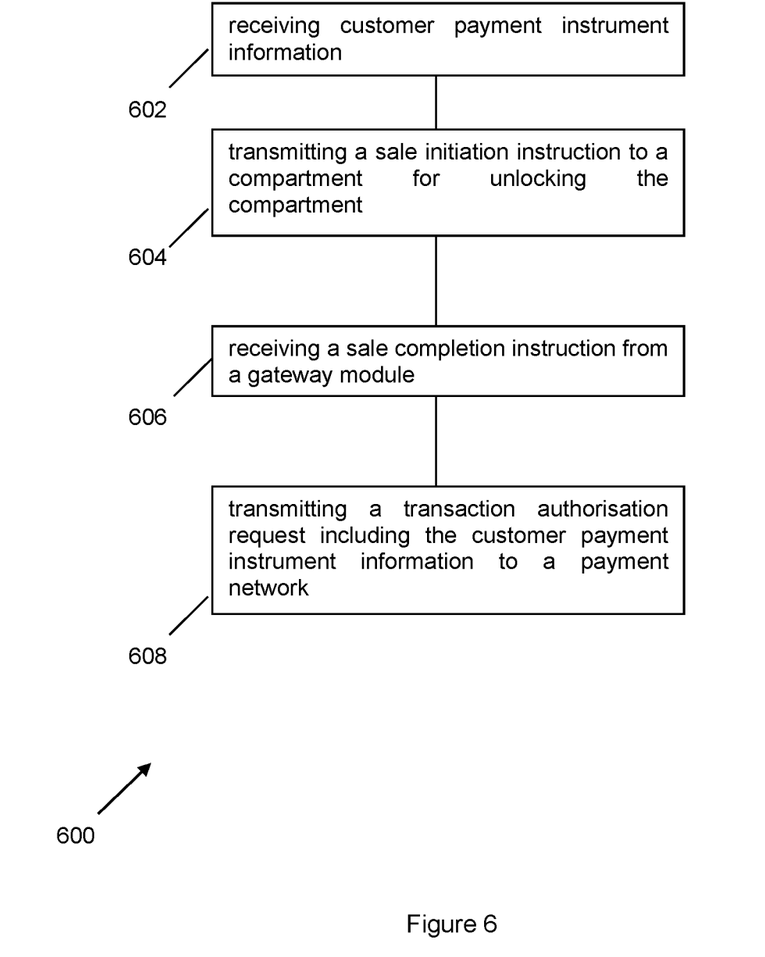
FIG. 6 shows a flowchart illustrating a method for facilitating a sale of an item from a seller to a customer according to another example embodiment.

FIG. 6 shows a flowchart 600 illustrating a method for facilitating a sale of an item from a seller to a customer according to another example embodiment. At step 602, customer payment instrument information is received. At step 604, a sale initiation instruction is transmitted to a compartment for unlocking the compartment. At step 606, a sale completion instruction is received from a gateway module. At step 608, a transaction authorisation request, including the customer payment instrument information, is transmitted to a payment network.

As described above, embodiments of the present invention provide a self-service device and methods that facilitate a sale of an item from a seller to a customer. The process of selling and buying things can be completed without the sellers and customers being attended to by a store owner or employee. The overall cost for running a marketplace may thus be significantly reduced, which will benefit the device owner, seller and customer. Further, the customer can inspect the item before making the purchase. This may enhance the shopping experience, as the item can be obtained immediately by the customer and it is less likely that the customer will purchase unsatisfactory goods.

Figure 7:
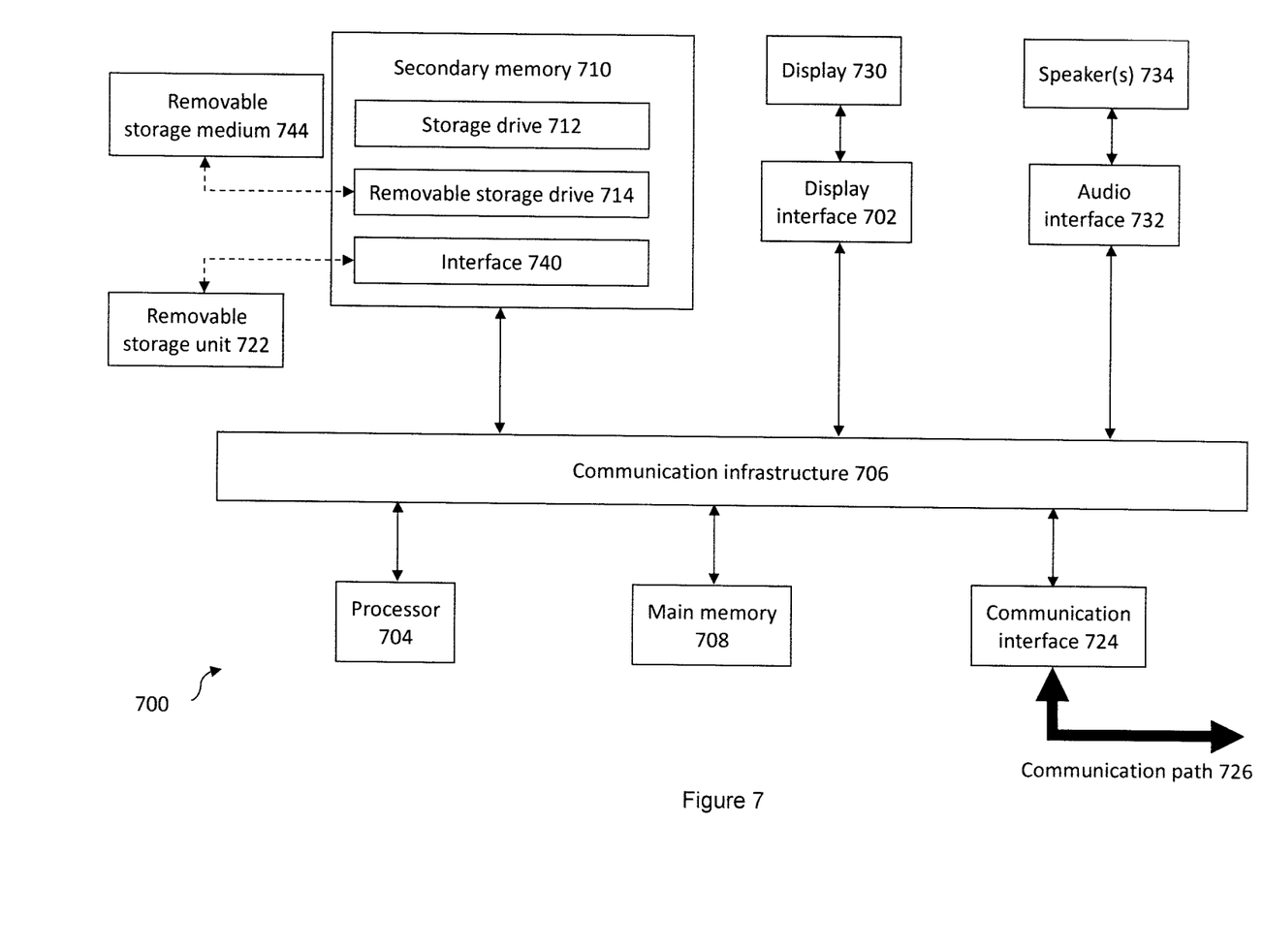
FIG. 7 shows a schematic diagram illustrating a computer suitable for implementing the device and methods of the example embodiments.

FIG. 7 depicts an exemplary computing device 700, hereinafter interchangeably referred to as a computer system 700, where one or more such computing devices 700 may be used in facilitating a sale of an item from a seller to a customer (e.g. to realise the gateway module 106 and/or user interface module 108). The following description of the computing device 700 is provided by way of example only and is not intended to be limiting.

As shown in FIG. 7, the example computing device 700 includes a processor 704 for executing software routines. Although a single processor is shown for the sake of clarity, the computing device 700 may also include a multi-processor system. The processor 704 is connected to a communication infrastructure 706 for communication with other components of the computing device 700. The communication infrastructure 706 may include, for example, a communications bus, cross-bar, or network.

The software routines, or computer programs, may be stored in memory and be executable by the processor to cause the computer system 700 to: (A) receive a sale initiation instruction from a user interface module, (B) unlock the compartment, wherein the compartment contains the item, (C) determine an occurrence of a predetermined event, (D) detect whether the item is absent from the compartment, and (E) if the item is absent from the compartment, transmit a sale completion instruction for completing the sale of the item. The software routines or computer programs may also comprise steps executable by the processor to cause the computer system 700 to perform the various other analytical steps (e.g. receiving customer payment instrument information; transmitting a sale initiation instruction to a compartment for unlocking the compartment; receiving a sale completion instruction from a gateway module; transmitting a transaction authorisation request including the customer payment instrument information to a payment network).

The computing device 700 further includes a main memory 708, such as a random access memory (RAM), and a secondary memory 710. The secondary memory 710 may include, for example, a hard disk drive 712 and/or a removable storage drive 714, which may include a floppy disk drive, a magnetic tape drive, an optical disk drive, or the like. The removable storage drive 714 reads from and/or writes to a removable storage unit 718 in a well-known manner. The removable storage unit 718 may include a floppy disk, magnetic tape, optical disk, or the like, which is read by and written to by removable storage drive 714. As will be appreciated by persons skilled in the relevant art(s), the removable storage unit 718 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 720. Examples of a removable storage unit 722 and interface 720 include a program cartridge and cartridge interface (such as that found in video game console devices), a removable memory chip (such as an EPROM or PROM) and associated socket, and other removable storage units 722 and interfaces 720 which allow software and data to be transferred from the removable storage unit 722 to the computer system 700.

The computing device 700 also includes at least one communication interface 724. The communication interface 724 allows software and data to be transferred between computing device 700 and external devices via a communication path 726. In various embodiments, the communication interface 724 permits data to be transferred between the computing device 700 and a data communication network, such as a public data or private data communication network. The communication interface 724 may be used to exchange data between different computing devices 700 which such computing devices 700 form part an interconnected computer network. Examples of a communication interface 724 can include a modem, a network interface (such as an Ethernet card), a communication port, an antenna with associated circuitry and the like. The communication interface 724 may be wired or may be wireless. Software and data transferred via the communication interface 724 are in the form of signals which can be electronic, electromagnetic, optical, or other signals capable of being received by communication interface 724. These signals are provided to the communication interface via the communication path 726.

As shown in FIG. 7, the computing device 700 further includes a display interface 702 which performs operations for rendering images to an associated display 730 and an audio interface 732 for performing operations for playing audio content via associated speaker(s) 734.

As used herein, the term "computer program product" may refer, in part, to removable storage unit 718, removable storage unit 722, a hard disk installed in hard disk drive 712, or a carrier wave carrying software over communication path 726 (wireless link or cable) to communication interface 724. Computer readable storage media refers to any non-transitory tangible storage medium that provides recorded instructions and/or data to the computing device 700 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer program product may thus comprise memory in which is stored instructions executable by the processor to cause the computer system 700 to: (A) receive a sale initiation instruction from a user interface module; (B) unlock the compartment, wherein the compartment contains the item; (C) determine an occurrence of a predetermined event; (D) detect whether the item is absent from the compartment; and (E) if the item is absent from the compartment, transmit a sale completion instruction for completing the sale of the item. The computer program product may also comprise steps which, when executed by the processor, cause the computer system 700 to perform the various other analytical steps (e.g. receiving customer payment instrument information, transmitting a sale initiation instruction to a compartment for unlocking the compartment, receiving a sale completion instruction from a gateway module, transmitting a transaction authorisation request including the customer payment instrument information to a payment network).

The computer programs (also called computer program code) are stored in main memory 708 and/or secondary memory 710. Computer programs can also be received via the communication interface 724. Such computer programs, when executed, enable the computing device 700 to perform one or more features of embodiments discussed herein. In various embodiments, the computer programs, when executed, enable the processor 704 to perform features of the above-described embodiments. Accordingly, such computer programs represent controllers of the computer system 700.

Software may be stored in a computer program product and loaded into the computing device 700 using the removable storage drive 714, the hard disk drive 712, or the interface 720. Alternatively, the computer program product may be downloaded to the computer system 700 over the communications path 726. The software, when executed by the processor 704, causes the computing device 700 to perform functions of embodiments described herein.

It is to be understood that the embodiment of FIG. 7 is presented merely by way of example. Therefore, in some embodiments one or more features of the computing device 700 may be omitted. Also, in some embodiments, one or more features of the computing device 700 may be combined together. Additionally, in some embodiments, one or more features of the computing device 700 may be split into one or more component parts.

In an implementation, the gateway module 106 and/or user interface module 108 may be generally described as a physical device comprising at least one processor and at least one memory including computer program code. The at least one memory and the computer program code are configured to, with the at least one processor, cause the physical device to perform the requisite operations.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A device for facilitating a sale of an item from a seller to a customer, the device comprising:
   a lockable compartment configured to initially receive the item from the seller, wherein the compartment unlocks upon receiving a sale initiation instruction so that the item can be removed and inspected by the customer;
   a sensor configured to detect a presence of the item in the compartment; and
   a gateway module configured to transmit a sale completion instruction for completing the sale of the item if upon an occurrence of a predetermined event, the sensor detects that the item is absent from the compartment, wherein such absence indicates an agreement by the customer to purchase the item.

2. The device as claimed in claim 1, wherein the device further comprises a user interface module, the user interface module being configured to:
   receive customer payment instrument information; and
   transmit the sale initiation instruction to the compartment for unlocking the compartment.

3. The device as claimed in claim 2, wherein the user interface module is further configured to:
   receive the sale completion instruction from the gateway module; and
   transmit a transaction authorisation request including the customer payment instrument information to a payment network.

4. The device as claimed in claim 3, wherein the user interface module is further configured to:
   receive seller payment instrument information; and
   transmit the seller payment instrument information to the payment network upon receiving the sale completion instruction, for processing payment of funds from the sale of the item to the seller based on the seller payment instrument information.

5. The device as claimed in claim 2, wherein the user interface module is further configured to:
   receive seller payment instrument information; and
   transmit the seller payment instrument information to a payment network if the sale of the item is terminated, for charging the seller a rental fee based on the seller payment instrument information.

6. The device as claimed in claim 2, wherein the device further comprises a display screen and wherein the user interface module is further configured to:
   receive item data from the seller; and
   transmit the item data to the display screen for displaying the item data.

7. The device as claimed in claim 6, wherein the item data comprises one or more selected from a group consisting of selling price of the item, description of the item, available discount, seller details, item review, and payment term.

8. The device as claimed in claim 1, wherein the compartment comprises a door, and wherein the predetermined event comprises the door being closed after the compartment receives the sale initiation instruction, such that the compartment is in a locked configuration.

9. The device as claimed in claim 1, wherein the predetermined event comprises a predefined period passing after the compartment receives the sale initiation instruction.

10. The device as claimed in claim 8, wherein at least a part of the door comprises a transparent material, allowing the item to be seen through the door.

11. A method for facilitating a sale of an item from a seller to a customer, the method comprising the steps of:
  initially receiving, in a compartment, the item from the seller, and locking the compartment containing the item;
  receiving, by the compartment, a sale initiation instruction from a user interface module;
  unlocking the compartment so that the item can be removed and inspected by the customer;
  determining an occurrence of a predetermined event;
  detecting, by a sensor, whether the item is absent from the compartment; and
  if the predetermined event has occurred and the item is absent from the compartment, transmitting, by a gateway module, a sale completion instruction for completing the sale of the item, wherein such absence indicates an agreement by the customer to purchase the item.

12. The method as claimed in claim 11, wherein the method further comprises the steps of:
  receiving, by the user interface module, customer payment instrument information; and
  transmitting, by the user interface module, the sale initiation instruction to the compartment for unlocking the compartment.

13. The method as claimed in claim 12, wherein the method further comprises the steps of:
  receiving, by the user interface module, the sale completion instruction from the gateway module; and
  transmitting, by the user interface module, a transaction authorisation request including the customer payment instrument information to a payment network.

14. The method as claimed in claim 13, wherein the method further comprises the steps of:
  receiving, by the user interface module, seller payment instrument information; and
  transmitting, by the user interface module, the seller payment instrument information to the payment network upon receiving the sale completion instruction, for processing payment of funds from the sale of the item to the seller based on the seller payment instrument information.

15. The method as claimed in claim 12, wherein the method further comprises the steps of:
  receiving, by the user interface module, seller payment instrument information; and
  transmitting, by the user interface module, the seller payment instrument information to a payment network if the sale of the item is terminated, for charging the seller a rental fee based on the seller payment instrument information.

16. The method as claimed in claim 11, wherein the method further comprises the steps of:
  receiving, by the user interface module, item data from the seller; and
  transmitting, by the user interface module, the item data to a display screen for displaying the item data.

17. The method as claimed in claim 11, wherein the compartment comprises a door, and wherein the predetermined event comprises the door being closed after the compartment receives the sale initiation instruction, such that the compartment is in a locked configuration.

18. The method as claimed in claim 17, wherein at least a part of the door includes a transparent material, allowing the item to be seen through the door.

19. The method as claimed in claim 11, wherein the predetermined event comprises a predefined period passing after the compartment receives the sale initiation instruction.

* * * * *